US008885827B2

(12) United States Patent
Abildgren et al.

(10) Patent No.: US 8,885,827 B2
(45) Date of Patent: Nov. 11, 2014

(54) SYSTEM AND METHOD FOR ENABLING A HOST DEVICE TO SECURELY CONNECT TO A PERIPHERAL DEVICE

(71) Applicant: Cambridge Silicon Radio Limited, Cambridge (GB)

(72) Inventors: Rasmus Abildgren, Aalborg (DK); Christopher St. John, March (GB); Neil Stewart, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 102 days.

(21) Appl. No.: 13/652,560

(22) Filed: Oct. 16, 2012

(65) Prior Publication Data

US 2014/0105394 A1 Apr. 17, 2014

(51) Int. Cl.
*H04K 1/00* (2006.01)

(52) U.S. Cl.
USPC .......................................................... 380/255

(58) Field of Classification Search
USPC .......................................................... 380/255
See application file for complete search history.

(56) References Cited

U.S. PATENT DOCUMENTS

| | | | |
|---|---|---|---|
| 2005/0154787 A1 | 7/2005 | Cochran et al. | |
| 2008/0146265 A1* | 6/2008 | Valavi | 455/550.1 |
| 2009/0298428 A1* | 12/2009 | Shin | 455/41.2 |
| 2011/0105024 A1* | 5/2011 | Palin et al. | 455/41.2 |
| 2012/0117636 A1* | 5/2012 | Adams | 726/9 |

FOREIGN PATENT DOCUMENTS

| | | |
|---|---|---|
| EP | 2407880 | 1/2012 |
| EP | 2615746 | 7/2013 |
| WO | WO 2012/033340 | 3/2012 |

OTHER PUBLICATIONS

Search Report for GB Appln. No. 1307784.7, dated Feb. 9, 2014.

* cited by examiner

*Primary Examiner* — Kambiz Zand
*Assistant Examiner* — Stephen Sanders
(74) *Attorney, Agent, or Firm* — RatnerPrestia

(57) ABSTRACT

Systems and methods to enable a new host device to wirelessly connect to a peripheral device without having to execute a secure pairing process. The method includes storing encryption and connection information for the peripheral device along with information identifying the peripheral device at a server. The new host device is then provided with the information identifying the peripheral device. The new host then uses the information identifying the peripheral device to obtain the encryption and connection information from the server. The new host can then use the encryption and connection information to connect and communicate with the peripheral device. The methods and systems described herein may be used, for example, to loan a peripheral device to the new host device, or to transfer the peripheral device to the new host device.

20 Claims, 6 Drawing Sheets

SYSTEM AND METHOD FOR ENABLING A HOST DEVICE TO SECURELY CONNECT TO A PERIPHERAL DEVICE

TECHNICAL FIELD

The present invention relates to systems and methods for enabling a host device to securely connect to a peripheral device.

BACKGROUND

Many wireless protocols, such as Bluetooth, require that before a host device and a peripheral device can securely communicate they must execute a secure pairing process. This is used to ensure that the host device is allowed to connect to the peripheral device (and vice versa) and to establish encryption parameters. Once the pairing process has been successfully completed the devices are said to have formed a bond. This enables the devices to establish an authenticated encrypted connection at any time without requiring the secure pairing process.

There are several problems, however, with many secure pairing processes. For example, many processes require the user to interact (directly or indirectly) with both the host device and the peripheral device. This typically makes the pairing process complicated and frustrating for users who have to press many buttons on the two devices.

The embodiments described below are not limited to implementations which solve any or all of the disadvantages of known wireless connection systems and methods.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments described herein relate to systems and methods for enabling a new host device to securely connect to a peripheral device without having to execute a secure pairing process. The method includes storing encryption and connection information for the peripheral device along with information identifying the peripheral device at a server. The new host device is then provided with the information identifying the peripheral device. The new host then uses the information identifying the peripheral device to obtain the encryption and connection information from the server. The new host device can then use the encryption and connection information to connect and communicate with the peripheral device. The methods and systems described herein may be used, for example, to loan a peripheral device to the new host device, or to permanently transfer the peripheral device to the new host device.

In a first aspect there is provided a computer-implemented method to enable a new host device to securely connect to a peripheral device, the method comprising: storing encryption information and connection information for the peripheral device in association with information identifying the peripheral device at a server; receiving at the new host device information identifying the peripheral device; transmitting a request from the new host device to the server for encryption information and connection information for the peripheral device, the request comprising the information identifying the peripheral device; receiving at the new host device the encryption information and the connection information for the peripheral device from the server; and establishing, via the new host device, a secure connection with the peripheral device using the encryption information and the connection information.

In a second aspect there is provided a system to enable a new host device to securely connect to a peripheral device, the system comprising: a peripheral device; a server configured to store encryption and connection information for the peripheral device in association with information identifying the peripheral device; and a new host device in communication with the server and the peripheral device, the new host device configured to: receive the information identifying the peripheral device; transmit a request to the server for the encryption information and connection information for the peripheral device, the request comprising the information identifying the peripheral device; receive the encryption information and the connection information from the server; and establish a secure connection with the peripheral device using the encryption information and the connection information.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
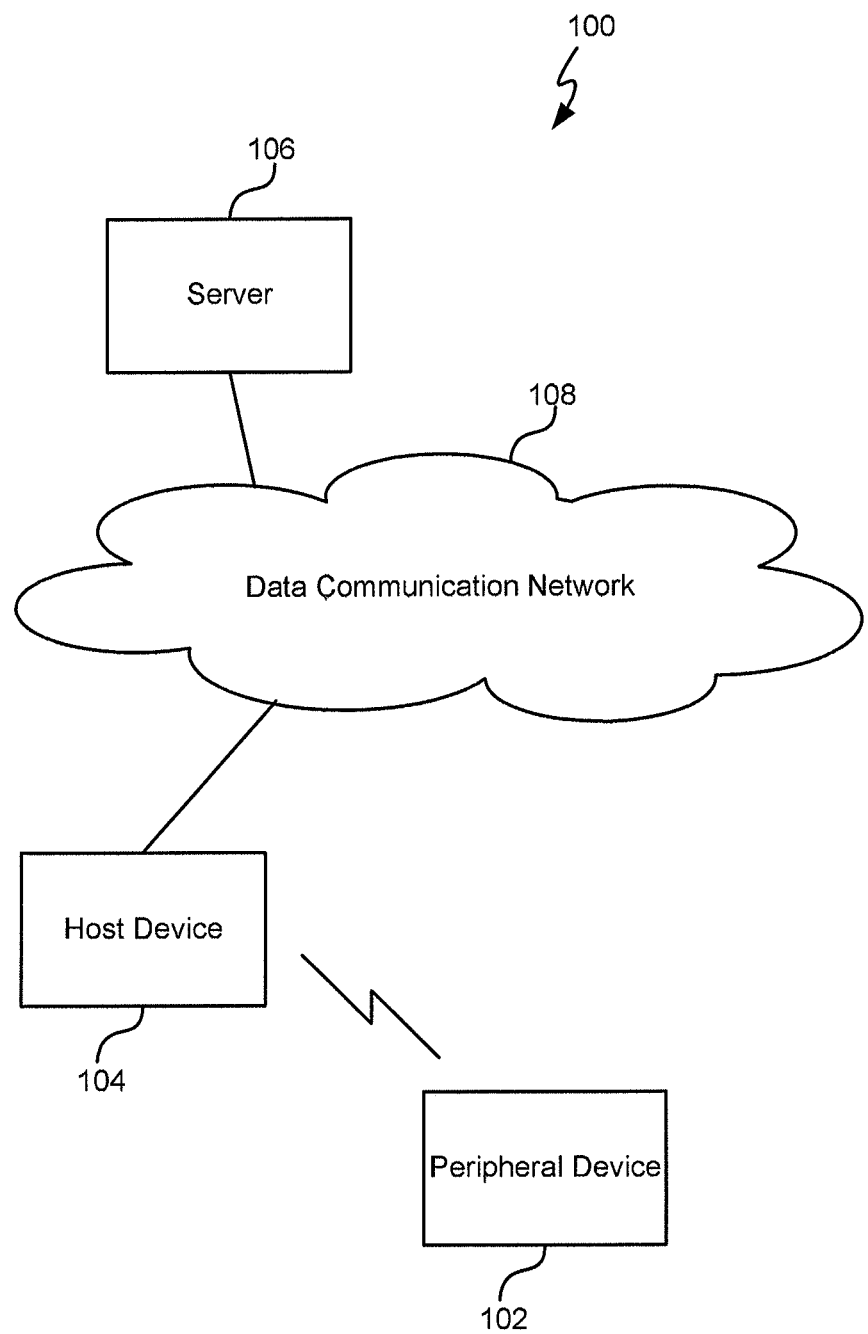
FIG. 1 is a schematic block diagram of a system for securely pairing a peripheral device with a host device.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Reference is made to FIG. 1 which shows a block diagram of a system 100 for securely pairing a peripheral device with a host device so that the peripheral device 102 can be easily accessed by another trusted host device. The system 100 comprises a peripheral device 102, a host device 104 to be connected to the peripheral device 102, a server 106 for storing encryption and connection information for the peripheral device 102, and a data communication network 108 for allowing the host device 104 to communicate with the server 106.

The peripheral device 102 is any device that may communicate with and be used by a host device 104, but is not part of the host device 104. The peripheral device 102 is therefore peripheral or auxiliary to the host device 104. The peripheral device 102 may be, but is not limited to, an input device (e.g. a mouse, keyboard, scanner, webcam, fitness sensor, heart rate sensor) that provides input to the host device 104, an output device (e.g. display, printer, speakers, or headphones) that allows the host device 104 to provide output to a user, a storage device (i.e. hard drive, flash drive, disk drive, a CD-ROM drive, a DVD-ROM drive) that stores data, or any device that is a combination of the above-mentioned devices.

The peripheral device 102 comprises a wireless communication module (not shown) that allows the peripheral device 102 to wirelessly communicate with the host device 104. The wireless communication module may be configured to use any suitable wireless protocol. For example the wireless communication module may be configured to use Bluetooth, Bluetooth LE (Low Energy), Near Field Communication (NFC), WiFi or any combination thereof.

The host device 104 is any computing device that is capable of communicating with and using the peripheral device 102. The host device 104 may be, but is not limited to, a mobile phone, a smart phone, a personal computer, a tablet computer, a laptop computer or the like. Although the host device 104 is shown as being in communication with a single peripheral device 102, it will be evident to a person of skill in the art that the host device 104 may be in communication with a plurality of peripheral devices and the principles described herein may be equally applied to any of the peripheral devices. It should be noted, though, that some wireless protocols limit the number of peripheral devices that any host device can be simultaneously in communication with.

Similarly, although the peripheral device 102 is shown in communication with a single host device 104, it will be evident to a person of skill in the art that the peripheral device 102 may be in communications with a plurality of host devices and the principles described herein may be equally applied to any host device.

The host device 104, like the peripheral device 102, comprises a wireless communication module (not shown) that allows the host device 104 to wirelessly communicate with the peripheral device 102.

Many wireless protocols, such as Bluetooth, require that before a host device 104 and a peripheral device 102 can securely communicate they must execute a secure pairing process. This is used to ensure that the host device is allowed to connect to the peripheral device (and vice versa) and to establish encryption parameters. Once the pairing process has been successfully completed the devices are said to have formed a bond. This enables the devices to establish an authenticated encrypted connection at any time without requiring the secure pairing process. In many cases, once a peripheral device 102 is paired with a host device 104 it may only communicate with that host device 104 until a new secure pairing process is executed. In some cases, after a new securing pairing process is executed the bond with the previous host (e.g. host device 104) is lost, hence repairing may be needed to establish a connection with the previous host (e.g. host device 104).

During the secure pairing process the host device 104 and the peripheral device 102 may establish encryption and connection information. The encryption information is used to authenticate the devices to one another. The encryption information may also be used to encrypt the communications between the devices so that the data is protected from eavesdropping. Where Bluetooth LE is the wireless protocol used for communication, the encryption information may include, but is not limited to, a long term key (LTK), an encrypted diversifier (EDIV) and a random number (RAND).

The connection information is used to enable communications between the devices. The connection information may comprise, but is not limited to, an address, an identity key (which can resolve an identity from a random number (e.g. resolvable private address)), connection time, and/or connection channel. The connection information may be generated by the peripheral device 102, the host device 104, or the peripheral device 102 and the host device 104 may come to an agreement (e.g. where a Diffie-Hellman key exchange was used). The device(s) generating the connection information may comprise an encryption engine such as SHA-2 (Secure Hash Algorithm 2) or AES (Advanced Encryption Standard)

There are several problems with many secure pairing processes. Firstly, many processes require the user to interact (directly or indirectly) with the host device and/or the peripheral device. This typically makes the pairing process complicated and frustrating for users who have to press one or more buttons on the two devices. Secondly, the pairing process also often reveals the peripheral device's unique connection information to the host device. This enables the host device to track the peripheral device even after the peripheral device has been transferred to a new host device. This makes it risky for a user to share his peripheral device with another user.

To make it easier and more secure for another trusted host device to access the peripheral device 102, in the system 100 of FIG. 1, the host device 104 is configured to obtain a permanent device ID (PID) for the peripheral device 102 that uniquely identifies the peripheral device 102. The PID may be comprised of letters, numbers and/or any other suitable characters. The PID may be in the form of a 128-bit universally unique identifier (UUID), bar code, serial number, or any kind of random number. In some cases, the PID may be generated by the host device 104. In other cases, the PID may be generated by the server 106. Specifically, the host device 104 may send a request to the server 106 for the PID, the server then generates the PID and returns it to the host device 104.

The host device 104 then provides the encryption information, connection information and PID to the server 106 via the data communication network 108 where it is stored. The information stored in the server 106 may then be used to grant another host device (such as host device 204 in FIG. 2) secure access to the peripheral device 102 without the other host device having to complete the secure pairing process with the peripheral device 102.

Specifically, instead of the other host device having to complete a secure pairing process with the peripheral device 102, the other host device is provided with information identifying the peripheral device (e.g. in some cases this may be the PID, or in other cases this may be a temporary device ID (TID)). The information identifying the peripheral device may be provided to the other host device by the original host device 104 or via other means (e.g. manually entered, or the host device 104 may send an email to the owner of the other host device containing the information identifying the peripheral device).

The other host device then uses the information identifying the peripheral device 102 to obtain the encryption and connection information from the server 106. Once the other host device has obtained the encryption and connection information it can connect to the peripheral device 102. The general principles described herein may be used to grant another host device temporary access to the peripheral device 102, and/or to permanently transfer the peripheral device 102 to another host device. Systems and methods for granting another host device temporary access to the peripheral device 102 will be described in reference to FIGS. 2 and 3. Systems and methods for permanently transferring the peripheral device 102 to another host device will be described in reference to FIGS. 4 and 5.

The server 106 is any computing-based device that is capable of storing and retrieving data. In some cases the server 106 may be in the form of a database, however, it will be evident to a person of skill in the art that the server 106 may take any suitable form. In some cases the server 106 is remotely located from the host device 104 and the peripheral device 102. The term "remotely located" is used herein to mean that the host device 104 and the peripheral device 102 are not in the same physical location as the server 106.

The data communication network 108 may be any network, or combination of networks, capable of enabling data communication between the host device 104 and the server 106. For example, the data communication network 108 may be a public switched telephone network (PSTN), a mobile telephone network, a wireless data network, a wired data network, or any combination thereof.

Figure 2:
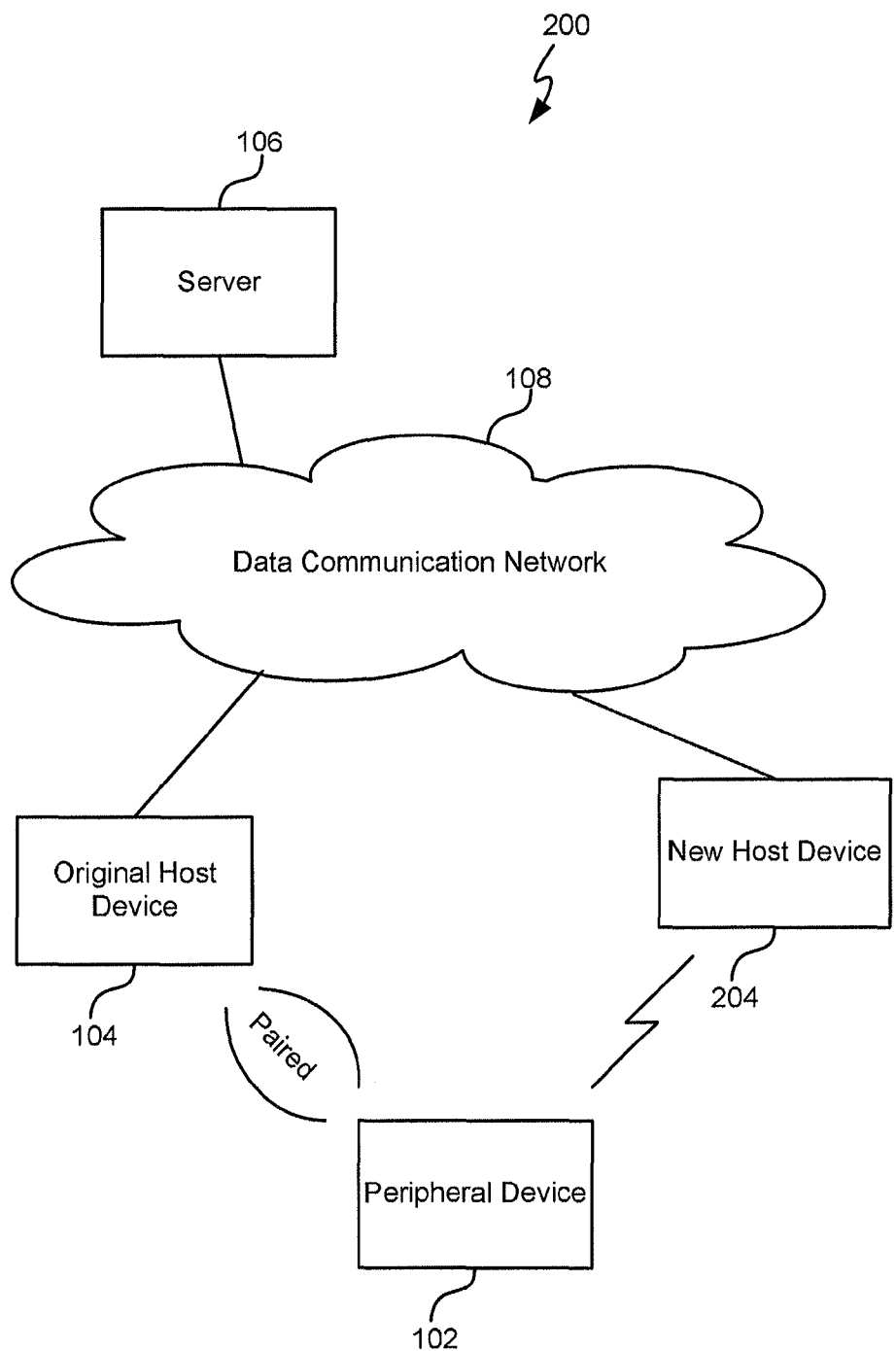
FIG. 2 is a schematic block diagram of a system for granting a new host device temporary access to a peripheral device.

Reference is now made to FIG. 2 which illustrates a system 200 for allowing a new host device 204 to temporarily access a peripheral device 102 that is connected to an original host device 104. This allows an original host device 104 to temporarily share a peripheral device 102 with another host device 204 in a secure manner.

System 200 of FIG. 2 comprises the peripheral device 102, the original host device 104, the server 106, and the data communication network 108 of FIG. 1. The peripheral device 102 has been securely paired with the original host device 104 using the method described above in reference to FIG. 1. The system 200 also comprises a new host device 204 that is granted temporary access to the peripheral device 102.

To enable the new host device 204 to temporarily access the peripheral device 102, the original host device 104 provides the new host device 204 with information identifying the peripheral device 102. For example, the original host device 104 may generate a temporary device ID (TID) which is provided to the server 106 and the new host device 204. The information identifying the peripheral device 102 may be provided from the original host device 104 to the new host device 204 using any suitable means. For example, in some cases the original and new host devices 104 and 204 may be in direct wireless communication. In other cases the original and new host devices 104 and 204 may communicate via the data communication network 108. In still other cases the information identifying the peripheral device may be manually transferred from the original host device 104 to the new host device 204. For example, the original host device 104 may display the information identifying the peripheral device 102. The displayed information may then be manually entered into the new host device 204 or scanned in by the new host device 204 (e.g. where the displayed information is a QR Code (Quick Response Code)).

The new host device 204 uses the information identifying the peripheral device 102 (e.g. the TID) to obtain the encryption and connection information for the peripheral device 102 from the server 106 via the data communication network 108. Once the new host device 204 has obtained the encryption and connection information it can use this information to connect and disconnect with the peripheral device 102 as many times as required. Once connected, the new host device 204 may obtain new connection and/or encryption information and provide this to the peripheral device 102 to be used for all future communications between the new host device 204 and the peripheral device 102. The new connection and/or encryption information is also provided to the server 106 where it is stored in association with the TID and the PID.

When the original host device 104 wants to reclaim the peripheral (e.g. because the new host device 204 no longer requires access or because the original host device 104 requires access to the peripheral device 102), the original host device 104 obtains the current connection and encryption information from the server 106 using the permanent device ID. The original host device 104 may then obtain new connection information and/or encryption information and provide this to the peripheral device 102 to be used for all future communications between the original host device 104 and the peripheral 102. Generating new connection and/or encryption information ensures that the new host device 204 cannot continue to communicate with the peripheral device 102 using the old connection information after access has been revoked.

In some cases the new connection information and/or encryption information may be generated by the original host device 104. In other cases, the new connection information and/or encryption information may be generated by the server 106 and provided to the original host device 104. The original host device 104 may also instruct the server 106 to disassociate the TID with the PID. This ensures that the new host device 204 cannot obtain the new connection and/or encryption information from the server 106 using the TID.

An exemplary method for enabling the new host device 204 to temporarily access the peripheral device 102 will be described in reference to FIG. 3.

Figure 3:
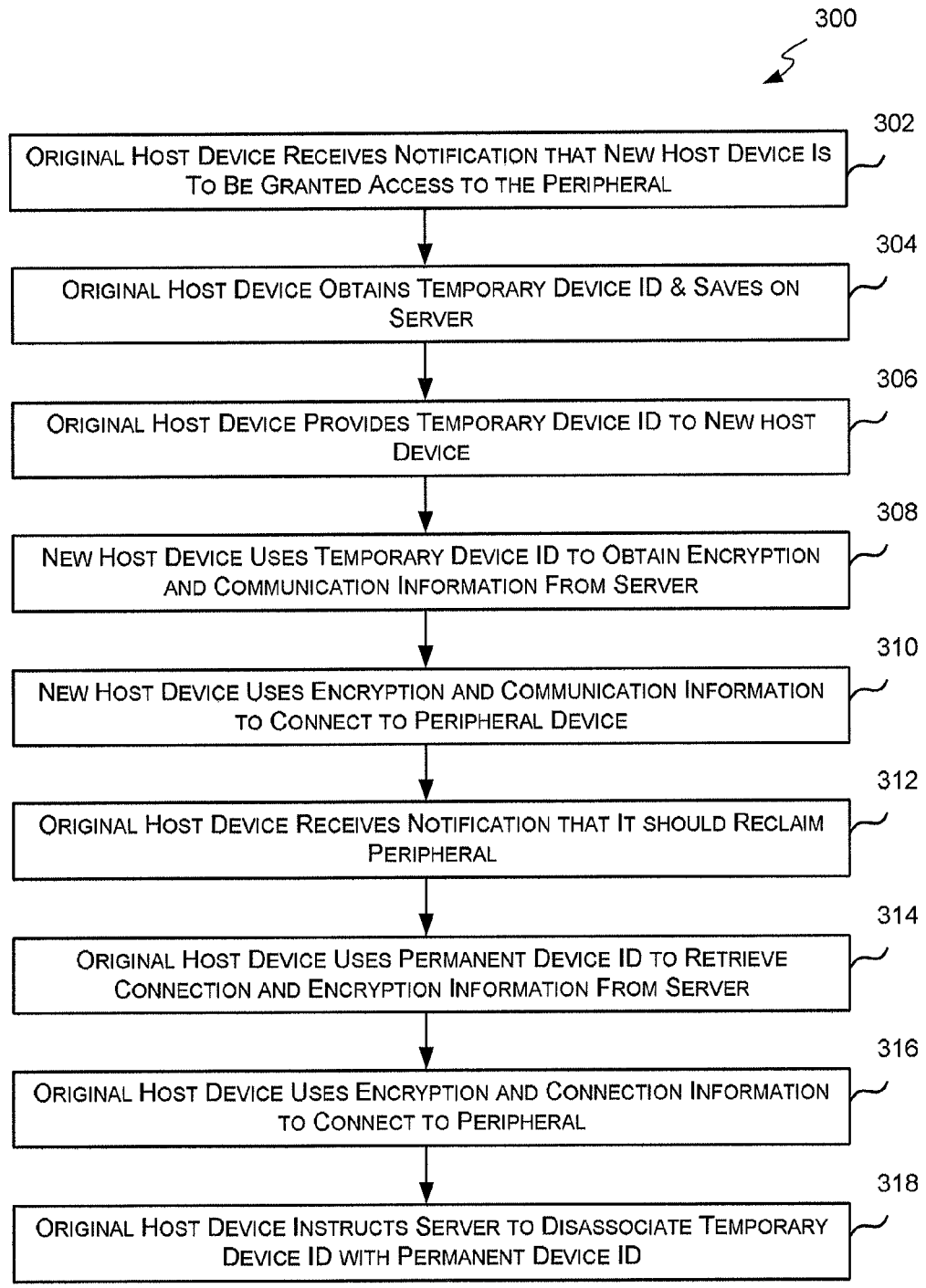
FIG. 3 is a flow chart of a method for granting a new host device temporary access to a peripheral device.

Reference is now made to FIG. 3 which illustrates a flow chart of a method 300 for enabling a new host device 204 to temporarily access a peripheral device 102 without having to initiate a secure pairing process. At step 302, the original host device 104 receives a notification that the new host device 204 is to be granted temporary access to the peripheral device 102. In some cases the notification is manually provided to the original host device 104. For example, the user may manually notify the original host device 104 of the request. In other cases the notification may be transmitted from the new host device 204 to the original host device 104. For example, a user may access an application running on the new host device 204 that allows the user to initiate transmission of the notification. In another example, the user may start corresponding applications on the two host devices 104 and 204 and when they are brought within close proximity the notification may automatically be transmitted. In yet other cases, the notification may be transmitted from the server 106 to the original host device 104. The notification may include information identifying the new host device 204 and information identifying the peripheral device (e.g. peripheral device 102). Once the original host device 104 receives the notification, the method 300 proceeds to step 304.

At step 304, the original host device 104 obtains a temporary device ID (TID) for the peripheral device 102. In some cases, the original host device 104 provides the TID to the server 106 along with information identifying the peripheral device (e.g. the PID). The server 106 then stores the TID in association with the encryption information, connection information and PID for the peripheral device 102. In other cases, the original host device 104 also obtains temporary connection and encryption information for the peripheral device 102. In these cases, the original host device 104 provides the PID, TID and temporary connection and encryption information to the server 106. The server 106 then stores the TID in association with the temporary connection and encryption information separately and distinctly from the PID and permanent connection and encryption information. In these cases there is, however, typically a link between the PID and the TID that allows that the original host device 104 to obtain the current connection and/or encryption information from the server 106 at any time using the PID, but does not allow the new host device 204 to obtain the PID or the permanent connection and/or encryption information using the TID.

In some cases the TID and/or temporary connection and encryption information is generated by the server 106. In these cases the original host device 104 sends a request to the server 106 for a TID and/or temporary connection and encryption information for the peripheral device 102. Upon receiving the request, the server 106 generates the TID and/or the temporary connection and encryption information, saves it in association with the PID (e.g. the temporary information is stored in association with the permanent information) or TID (e.g. the temporary information is stored separately from the permanent information), and sends the TID and/or temporary connection and encryption information to the original host device 104. If temporary connection and encryption information is generated, the original host device 104 then provides the temporary connection and encryption information to the peripheral device 102.

In other cases the TID and/or temporary connection and encryption information is generated by the original host device 104. In these cases the original host device 104 provides the PID, TID and/or temporary connection and encryption information to the server 106 (where it is stored in association with the PID or TID). If temporary connection and encryption information is generated, the original host device 104 also provides the temporary connection and encryption information to the peripheral device 102.

Once the TID has been obtained and saved by the server 106, the method 300 proceeds to step 306.

At step 306, the original host device 104 provides the TID generated in step 304 to the new host device 204. In some cases, the new host device 204 may require the user to confirm acceptance of the TID. For example, the new host device 204 may be configured to display a prompt, such as "Would you like to receive the TID for device X?" where X is a description of the peripheral device 102. If the user accepts the TID, the method proceeds to step 308. If the user does not accept the TID the method 300 may end.

At step 308, the new host device 204 uses the TID received in step 306 to obtain the encryption information and the connection information for the peripheral device 102 from the server 106. For example, the new host device 204 may transmit a request to the server 106 for the encryption and connection information associated with the TID via the data communication network 108. The server 106 may then search its records for the encryption and connection information associated with the TID provided. Upon locating the encryption and connection information matching the request it provides the located information to the new host device 204 via the communication network 108. Once the new host device 204 receives the encryption and connection information from the server 106, the method 300 proceeds to step 310.

At step 310, the new host device 204 uses the encryption information and the connection information to connect to the peripheral device 102. For example, the new host device 204 may use the connection information to resolve the identity of peripheral devices close to it. For example, in cases where the communication protocol is Bluetooth, when the new host device 204 does a search for Bluetooth devices it will likely find one or more unknown devices. It then can use the connection information to resolve the private device address of the unknown devices. Having done this, if there is a match between the resolved private device addresses and the new host device's internal list of known devices the new host device 204 establishes a connection to this peripheral. Once a connection has been established with the peripheral the new host device 204 may request an encrypted connection (using the encryption information) in order to authenticate and secure the connection.

In some cases, once the new host device 204 and the peripheral device 102 are connected the new host device 204 may use and communicate with the peripheral device 102 in the same manner as the original host device 104. In other cases, the actions that may be executed by the new host device 204 may be restricted. For example, the connection and/or encryption information used by the new host device 204 may indicate to the peripheral device 102 that the new host device 204 is only a temporary host. For example, the encryption information may comprise an encryption key that belongs to a specific series or pool of encryption keys that identifies it as being associated with a temporary host.

In some cases, once the new host device 204 has connected to the peripheral device 102 the new host device 204 may obtain new connection information and/or encryption information.

In some cases the new connection and encryption information is generated by the server 106. In these cases the new host device 204 sends a request to the server 106 for new connection and/or encryption information for the peripheral device 102. Upon receiving the request, the server 106 generates the new connection and/or encryption information, saves it in association with the TID and sends the new connection and/or encryption information to the new host device 204 who provides it to the peripheral device 102.

In other cases the new connection and encryption information is generated by the new host device 204. In these cases the new host device 204 provides the new connection and/or encryption information to the peripheral device 102. In some cases, the new host device 204 may also provide the new connection and/or encryption information to the server 106 where it is stored in association with the TID. In these cases the original host device 104 is able reclaim the peripheral 102 at any time by obtaining the latest/current connection and/or encryption information from the server 106 using the PID. In other cases, the new host device 204 may only share the new connection and/or encryption information with the server 106 after the new host device 204 no longer requires the peripheral device 102. In these cases the new host device 204 is able to maintain a private connection with the peripheral device 102. Specifically, in these cases the original host device 104 is unable to obtain the new connection and/or encryption information from the server 106 until the peripheral device 102 no longer requires the peripheral device 102 and provides the latest connection and/or encryption information to the server 106.

In some cases, to ensure that that the server 106 always has accurate connection and encryption information, the peripheral device 102 may be configured to only accept connection and/or encryption information that has been generated by the server 106. For example, in some cases any connection and/or encryption information generated by the server 106 may be signed so that it can be verified by the peripheral device 102 using a private key. This is intended to prevent the new host device 204 from generating new connection and/or encryption information and failing to provide this to the server 106.

In some cases, the new host device 204 may be configured to obtain new connection information each time it establishes a new session with the peripheral device 102.

At step 312, the original host device 104 receives a notification that it should reclaim the peripheral device 102. The original host device 104 may receive such a notification when the new host device 204 no longer requires use of the peripheral device 102, or when the original host device 104 requires access to the peripheral device 102.

In some cases the notification is manually provided to the original host device 104. For example, the user may manually provide the notification via an input device, such as a mouse, keyboard or touch screen. In other cases (e.g. where the new host device 204 no longer requires use of the peripheral device 102), the new host device 204 may be configured to transmit the notification to the original host device 104. Once the original host device 104 has received the notification the method 300 proceeds to step 314.

At step 314, the original host device 104 uses the PID to retrieve the current connection information and encryption information for the peripheral device 102 from the server 106. For example, the original host device 104 may send a request to the server 106 for the connection information for a specified PID. Upon receiving the request the server 106 searches its records to locate connection and encryption information associated with the specified PID. If any connection and encryption information matching the criteria is located it is transmitted to the original host device 104. Once the original host device 104 receives the current connection and encryption information from the server 106 the method 300 proceeds to step 316.

At step 316, the original host device 104 uses the connection and encryption information obtained in step 314 to connect to the peripheral device 102. The original host device 104 may then obtain new connection and/or encryption information and provide it to the peripheral device 102 and to the server 106. The original host device 104 and the peripheral device 102 then use the new connection information and/or encryption information for future communications.

In some cases the new connection and/or encryption information is generated by the server 106. In these cases the original host device 104 sends a request to the server 106 for new connection and encryption information for the peripheral device 102. Upon receiving the request, the server 106 generates the new connection and/or encryption information, saves it in association with the PID (e.g. it replaces the connection and/or encryption information associated with the specified PID with the new connection and/or encryption information) and sends the new connection and/or encryption information to the original host device 104 who provides it to the peripheral device 102.

In other cases the new connection and/or encryption information is generated by the original host device 104. In these cases the original host device 104 provides the new connection and/or encryption information to the server 106 (where it is stored in association with the PID) and the peripheral device 102.

Generating and using new connection information makes it more difficult for the new host device 204 to track the peripheral device 102. Once the new connection and/or encryption information has been generated and provided to the peripheral device 102 and the server 106, the method proceeds to step 318.

At step 318, the original host device 104 instructs the server 106 to remove or dissociate the TID from the PID. It will be evident to a person of skill in the art that in some cases steps 316 and 318 may be combined. For example, when the original host device 104 notifies the server 106 of the new connection information, the original host device 104 may also instruct the server 106 to disassociate the TID. Disassociating the TID from the PID stops the new host device 204 from being able to obtain the new connection information and/or encryption information from the server 106.

The methods and systems described in reference to FIGS. 2 and 3 may be used when a user wants to share a peripheral device (e.g. a wireless headset) between its own host devices (e.g. a smart phone and a tablet computer) without requiring the second host device to execute a secure pairing process.

The methods and systems described in reference to FIGS. 2 and 3 may also be used where a user has a peripheral device (e.g. heart rate sensor) that generates data that may be used by a user owned host device (e.g. a smart phone), but also a third party owned host device (e.g. a running machine at a gym). The methods and systems described herein in reference to FIGS. 2 and 3 allow the user to grant the third party owned host device (e.g. a running machine at a gym) temporary access to the peripheral device 102 in such as manner that no information is revealed to the third party host device (e.g. running machine at the gym) that allows the peripheral device to be tracked once the third party owned host device is disconnected from the peripheral device.

Figure 4:
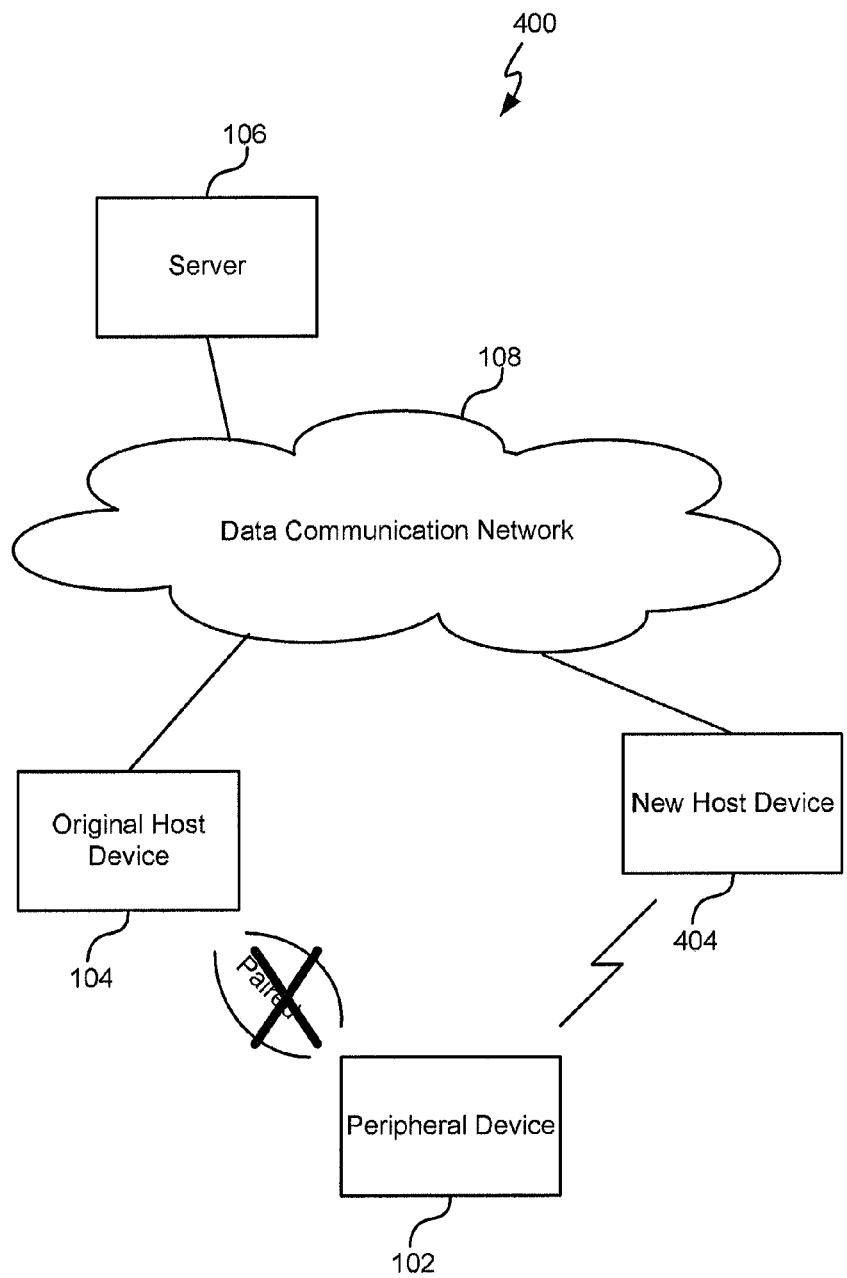
FIG. 4 is a schematic block diagram of a system for permanently transferring a peripheral device from an original host device to a new host device.

Reference is now made to FIG. 4 which illustrates a system 400 for enabling a peripheral device 102 to be permanently transferred from an original host device 104 to a new host device 404 without requiring the new host device 404 and the peripheral device 102 to execute a secure pairing process. The term "permanently transferred" is used herein in to mean that the peripheral device is indefinitely transferred to another host device. It is not intended to mean that the peripheral device is transferred to another host device in perpetuity. After a peripheral device has been permanently transferred, the recipient (e.g. new host device 404) has complete control over the peripheral device and the donor or transferee (e.g. original host device 104) has no ability to control the peripheral device unless granted control by the recipient.

System 400 of FIG. 4 comprises the peripheral device 102, the original host device 104, the server 106, and the data communication network 108 of FIG. 1. The peripheral device 102 has been securely paired with the original host device 104 using the method described above in reference to FIG. 1. The system 400 also comprises a new host device 404 to which the peripheral device 102 is to be permanently transferred.

To enable the peripheral device 102 to be permanently transferred from the original host device 104 to the new host device 404, the original host device 104 provides the new host device 404 with information identifying the peripheral device 102 (e.g. the PID). The information identifying the peripheral device 102 may be provided from the original host device 104 to the new host device 404 using any suitable means. For example, in some cases the original and new host devices 104 and 404 may be in direct wireless communication. In other cases the original and new host devices 104 and 404 may communicate via the data communication network 108. In still other cases the information identifying the peripheral device may be manually transferred from the original host device 104 to the new host device 404. For example, the original host device 104 may display the information identifying the peripheral device 102. The displayed information may then be manually entered into the new host device 404 or scanned into the new host device 404.

The new host device 404 then uses the information identifying the peripheral device 102 (e.g. the permanent device ID) to obtain the encryption and connection information from the server 106. The new host device 404 then uses the encryption and connection information to communicate with the peripheral device 102. The new host device 404 may then generate or obtain a new permanent device ID and new connection and encryption information so that the original host device 104 can no longer connect to the peripheral device 102.

An exemplary method for transferring the peripheral device 102 from the original host device 104 to the new host device 404 will be described in reference to FIG. 5.

Figure 5:
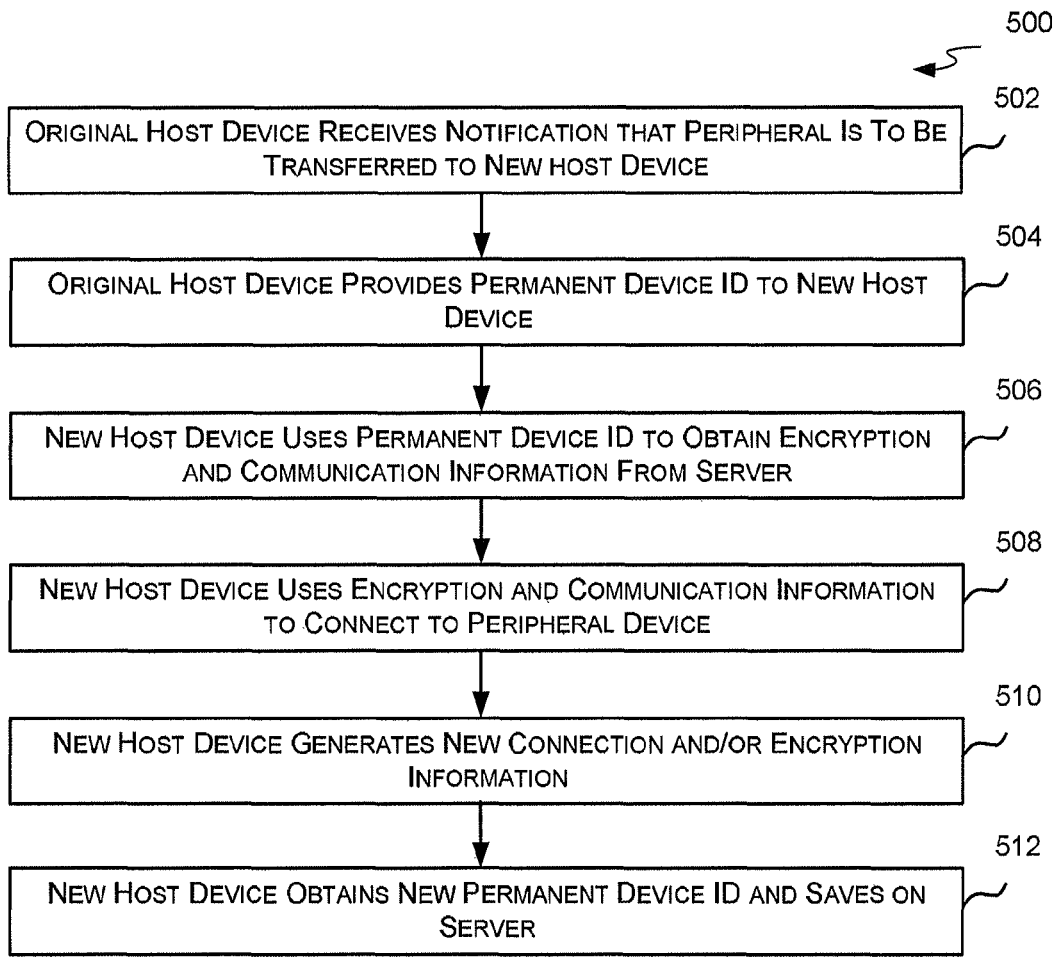
FIG. 5 is a flow chart of a method for permanently transferring a peripheral device from an original host device to a new host device.

Reference is now made to FIG. 5 which illustrates a flow chart of a method 500 for transferring a peripheral device 102 from an original host device 104 to a new host device 404. At 502, the original host device 104 receives a notification that the peripheral device 102 is to be transferred to a new host device 404. In some cases the notification is manually provided to the original host device 104. For example, the user may manually enter the notification information. In other cases the notification is transmitted from the new host device 404 to the original host device 104. For example, a user may access an application running on the new host device 404 that allows the user to initiate transmission of the notification. In another example, the user may start corresponding applications on the two host devices 104 and 404 and when they are brought within close proximity the notification may be automatically transmitted. In other cases the notification may be transmitted to the new host device 404 from the server 106.

The notification may include information identifying the new host device 404 and information identifying the peripheral device (e.g. peripheral device 102). Once the original host device 104 receives the notification, the method 500 proceeds to step 504.

At step 504, the original host device 104 provides the PID generated during the secure pairing process to the new host device 404. In some cases, the new host device 404 may require the user to confirm acceptance of the PID. For example, the new host device 404 may be configured to display a prompt, such as "Would you like to receive the PID for device X?" where X is a description of the peripheral device 102. If the user accepts the PID, the method proceeds to step 506. If the user does not accept the PID the method 500 may end.

At step 506, the new host device 404 uses the PID received in step 504 to obtain the encryption and connection information for the peripheral device 102 from the server 106. For example, the new host device 404 may transmit a request to the server 106 for the encryption and connection information associated with the PID via the data communication network 108. The server 106 may then search its records for the encryption and connection information associated with the PID provided. Upon locating the encryption and connection information matching the request it provides the located information to the new host device 404 via the communication network 108. Upon receiving the encryption information and the connection information from the server 106, the method 500 proceeds to step 508. It should be noted that a significant amount of time may elapse between steps 506 and 508. For example, where the peripheral 102 has been sold and posted to a new owner, the there could be a long delay (e.g. days) between steps 506 and 508.

At step 508, the new host device 404 uses the encryption and connection information to connect to the peripheral device 102. Once the new host device 404 and the peripheral device 102 are connected the new host device 404 may use the peripheral device 102 as normal. Once connected, the method 500 proceeds to step 510.

At step 510, new connection and encryption information are generated and shared between the peripheral device 102 and the new host device 404. The new host device 404 and the peripheral device 102 then use this new communication and encryption information to communicate with each other. Changing the connection information makes it more difficult for any device, including the original host device 104, to track the peripheral device 102. Changing the encryption information also makes it difficult (if not impossible) for the original host device 104 to re-authenticate with the peripheral device 102 and thereby retake ownership of the peripheral device 102.

In some cases the new connection and encryption information is generated by the server 106. In these cases the new host device 404 sends a request to the server 106 for new connection and encryption information for the peripheral device 102. Upon receiving the request, the server 106 generates the new connection and encryption information, saves it in association with the PID, and sends the new connection and encryption information to the new host device 404. The new host device 404 then provides the new connection and encryption information to the peripheral device 102.

In other cases the new connection and encryption information is generated by the new host device 404. In these cases the new host device 404 provides the new connection and encryption information to the server 106 (where it is stored in association with the PID) and the peripheral device 102.

Once the new connection and encryption information has been provided to the peripheral device 102, the method proceeds to step 512.

At step 512, a new permanent device ID (PID) is generated for the peripheral device 102 and saved by the server 106 and the new host device 404. Changing the PID ensures that the original host device 104 can no longer retrieve the current connection and encryption information from the server 106.

In some cases the new PID is generated by the server 106. In these cases the new host device 404 sends a request to the server 106 for a new PID for the peripheral device 102. Upon receiving the request, the server 106 generates the new PID, saves it over the old PID, and sends the new PID to the new host device 404.

In other cases the new PID is generated by the new host device 404. In these cases the new host device 404 provides the new PD to the server 106 (where it is stored in association with the encryption information and the connection information). Once the new PID has been provided to the server 106 and the new host device 404, the method 500 ends.

In some cases, instead of generating a new PID to ensure that the original host device 104 can no longer retrieve the current connection and encryption information from the server 106, the PID may be associated with authentication information for the host device that is the current "owner" of the device. In these cases, the server 106 may originally store authentication information for the original host device 104 in association with the PID. Then, after the peripheral device 102 has been transferred the new host device 404, the original host's device's authentication information may expire and/or be replaced with the new host device's 404 authentication information.

In some cases the original host device 104 may be owned by the manufacturer of the peripheral device 102 and the secure pairing described in reference to FIG. 1 is performed by the manufacturer at the time of production. This removes the need for the original purchaser of the peripheral device 102 to execute a secure pairing process between their host device and the peripheral device. In these cases the manufacturer's host device 104 may be connected to the data communication network 108 and the user's host device may be able to retrieve the information identifying the peripheral device (e.g. the permanent device ID) from the manufacturer's host device via the data communication network 108. In other cases the manufacturer's host device 104 may not be connected to the data communication network 108 therefore the information identifying the peripheral device (e.g. the permanent device ID) may be provided to the user's host device via other means. For example, when the user purchases the peripheral device 102 they may be provided with a label, external tag or the like that includes the information identifying the peripheral device (e.g. the permanent device ID). The information can be read by the user's host device or manually entered into the user's host device to initiate the transfer process described in relation to FIGS. 4 and 5.

In the cases where the secure pairing is performed by the manufacturer at the time of production the peripheral device 102 may not require any input buttons. For example, in some cases the only function of an external button on a peripheral device (e.g. a fitness sensor or heart rate monitor) may be to initiate and execute the secure pairing process. Therefore when the secure pairing is performed by the manufacturer the peripheral can be built without these buttons thus simplifying the design of the peripheral device 102.

Although in the embodiments described above the host device 104 is shown as being a separate and distinct device from the server 106, in other embodiments the host device 104 and the server 106 may be implemented in a single device. Specifically, there may be a single device that performs the functions of the host device 104 and the server 106. In these cases there may be no definable data communications network between the host device and the server.

Although in the embodiments described above the host devices 104, 204 and 404 are shown as being in wireless communication with the peripheral 102, it will be evident to a person of skill in the art that the principles described herein may equally be applied to systems wherein one or more of the host devices 104, 204 and 404 is in wired communication with the peripheral 102.

Figure 6:
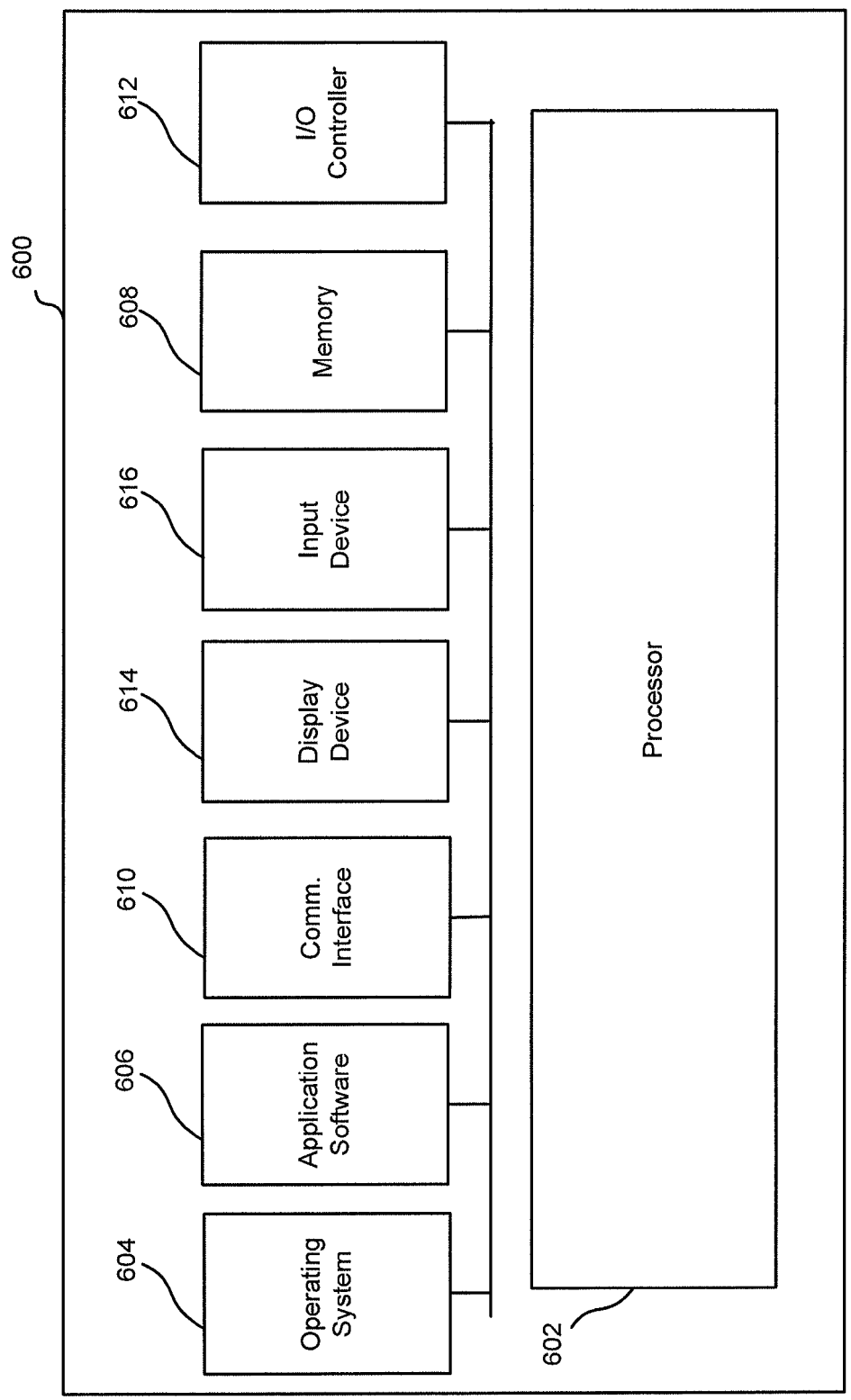
FIG. 6 is a block diagram of an exemplary host device.

Reference is now made to FIG. 6 which illustrates an exemplary host device 600 which may be implemented as any form of a computing and/or electronic device, and in which embodiments of the foregoing description may be implemented.

Host device 600 comprises one or more processors 602 which may be microprocessors, controllers or any other suitable type of processors for processing computer executable instructions to control the operation of the device in order to run applications. In some examples, for example where a system on a chip architecture is used, the processors 602 may include one or more fixed function blocks (also referred to as accelerators) which implement a part of the method of operation of the end-user device 602 or applications described herein in hardware (rather than software or firmware). Platform software comprising an operating system 604 or any other suitable platform software may be provided at the host device 600 to enable application software 606 to be executed on the device.

The computer executable instructions may be provided using any computer-readable media that is accessible by the host device 600. Computer-readable media may include, for example, computer storage media such as memory 608 and communications media. Computer storage media, such as memory 608, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 608) is shown within the host device 600 it will be appreciated that the storage may be distributed or located remotely and accessed via a network or other communication link (e.g. using communication interface 610).

The host device 600 also comprises an input/output controller 612 arranged to output display information to a display device 614 which may be separate from or integral to the host device 600. The display information may provide a graphical user interface. The input/output controller 612 is also arranged to receive and process input from one or more devices, such as a user input device 616 (e.g. a mouse or a keyboard). In an embodiment the display device 614 may also act as the user input device 616 if it is a touch sensitive display device. The host device 600 may also be provided with other functionality as is known for such devices.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method to enable a new host device to securely connect to a peripheral device, the method comprising:
    storing encryption information and connection information for the peripheral device in association with information identifying the peripheral device at a server;
    receiving at the new host device the information identifying the peripheral device;
    transmitting a request from the new host device to the server for encryption information and connection information for the peripheral device, the request comprising the information identifying the peripheral device;
    receiving at the new host device the encryption information and the connection information for the peripheral device from the server; and
    establishing, via the new host device, a secure connection with the peripheral device using the encryption information and the connection information without the new host device having completed a secure pairing process with the peripheral device.

2. The method according to claim 1, wherein the peripheral device is connected to an original host device and the original host device provides the new host device with the information identifying the peripheral device.

3. The method according to claim 2, further comprising:
    generating a permanent device ID for the peripheral device; and
    storing the permanent device ID at the server in association with the encryption information and the connection information.

4. The method according to claim 3, wherein the information identifying the peripheral device comprises the permanent device ID.

5. The method according to claim 4, further comprising:
    obtaining at the new host device new connection information;
    transmitting the new connection information from the new host device to the peripheral device; and
    establishing, via the new host device, a secure connection with the peripheral device using the new connection information and the encryption information.

6. The method according to claim 4, further comprising:
    generating a new permanent device ID; and
    storing the new permanent device ID in place of the permanent device ID at the server.

7. The method according to claim 3, further comprising:
    generating a temporary device ID for the peripheral device;
    storing the temporary device ID in association with the permanent device ID at the server;
    wherein the information identifying the peripheral device comprises the temporary device ID.

8. The method according to claim 7, further comprising:
    receiving a notification at the original host device that the original host device is to reclaim the peripheral device;
    upon receiving the notification at the original host device, transmitting a request from the original host device to the server for the connection information and encryption information, the request comprising the permanent device ID; and
    establishing a connection, via the original host device, with the peripheral device using the encryption and connection information.

9. The method according to claim 8, further comprising:
    transmitting a request from the original host device to the server to disassociate the temporary device ID from the permanent device ID; and
    disassociating the temporary device ID from the permanent device ID.

10. The method according to claim 7, further comprising:
    generating new connection information;
    transmitting the new connection information from the original host device to the peripheral device to be used for future communications between the peripheral device and the original host device; and
    replacing the connection information at the server with the new connection information.

11. A system to enable a new host device to connect to a peripheral device, the system comprising:
    a peripheral device;
    a server configured to store encryption and connection information for the peripheral device in association with information identifying the peripheral device; and
    a new host device in communication with the peripheral device and the server, the new host device configured to:
        receive the information identifying the peripheral device;
        transmit a request to the server for the encryption information and connection information for the peripheral device, the request comprising the information identifying the peripheral device;
        receive the encryption information and the connection information from the server; and
        establish a secure connection with the peripheral device using the encryption information and the connection information without the new host device having completed a secure pairing process with the peripheral device.

12. The system according to claim 11, further comprising an original host device in communication with the server, the original host device configured to provide the new host device with the information identifying the peripheral device.

13. The system according to claim 11, wherein the original host device is further configured to obtain a permanent device ID, and the server is further configured to store the permanent device ID in association with the encryption information and the connection information.

14. The system according to claim 13, wherein the information identifying the peripheral device comprises the permanent device ID.

15. The system according to claim 14, wherein the new host device is configured to:
- obtain new connection information;
- transmit the new connection information to the peripheral device; and
- establish a secure connection with the peripheral device using the new connection information and the encryption information.

16. The system according to claim 14, wherein the new host device is further configured to obtain a new permanent device ID; and
- the server is further configured to replace the permanent device ID with the new permanent ID.

17. The system according to claim 13, wherein the original host device is further configured to obtain a temporary device ID for the peripheral device; and
- the server is further configured to store the temporary device ID in association with the permanent device ID;
- wherein the information identifying the peripheral device comprises the temporary device ID.

18. The system according to claim 17, wherein the original host device is further configured to:
- receive a notification that the original host device is to reclaim the peripheral device;
- upon receiving the notification at the original host device, transmit a request to the server for the connection information and encryption information, the request comprising the permanent device ID; and
- establish a connection with the peripheral device using the encryption and connection information.

19. The system according to claim 18, wherein the original host device is further configured to transmit a request to the server to disassociate the temporary device ID from the permanent device ID.

20. The system according to claim 18, wherein the original host device is further configured to:
- obtain new connection information;
- transmit the new connection information to the peripheral device to be used for future communications between the peripheral device and the original host device; and
- the server is further configured to replace the connection information with the new connection information.

* * * * *